(No Model.) 2 Sheets—Sheet 1.
P. J. McMAHON.
APPARATUS FOR MAKING ANHYDROUS AMMONIA.
No. 525,858. Patented Sept. 11, 1894.
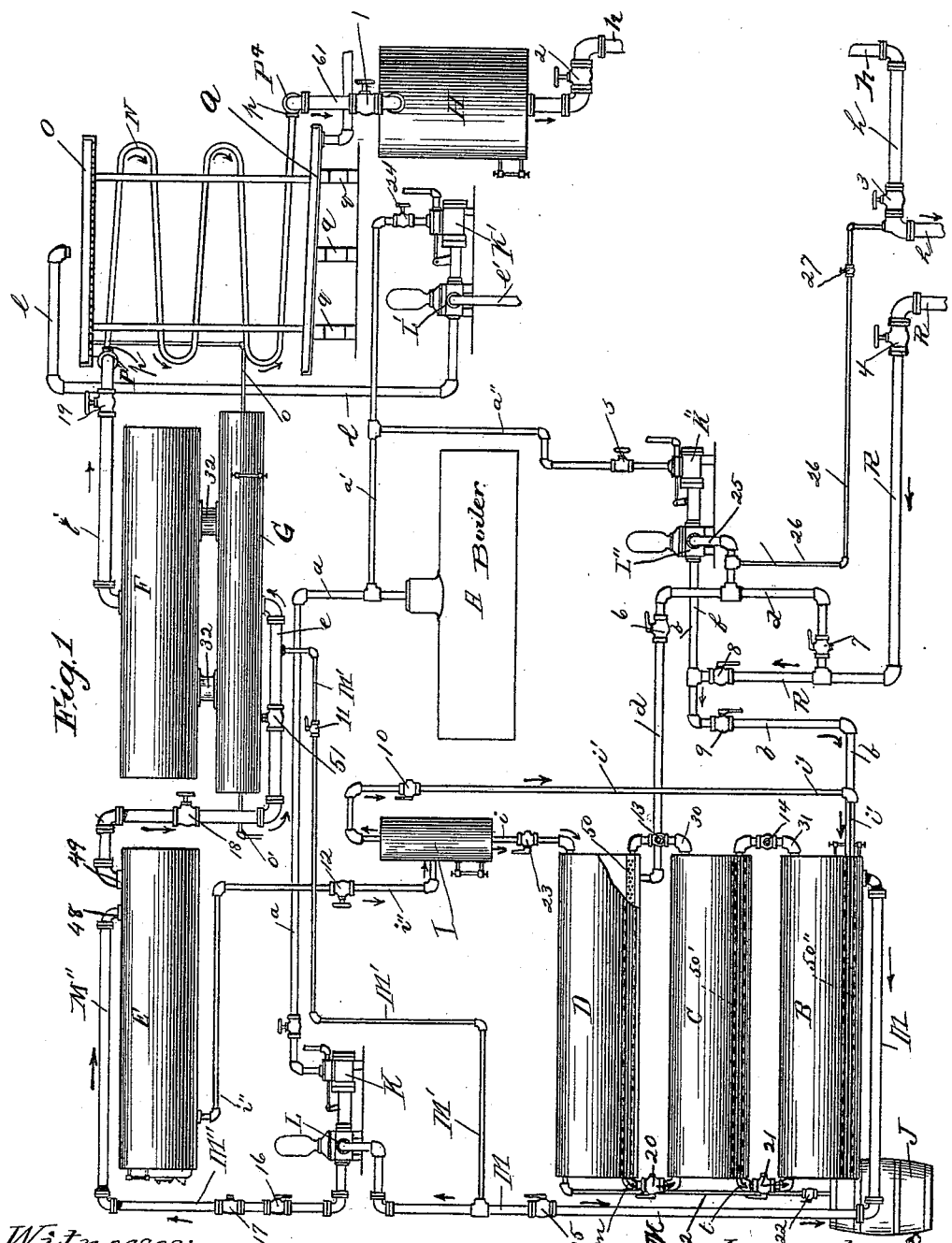

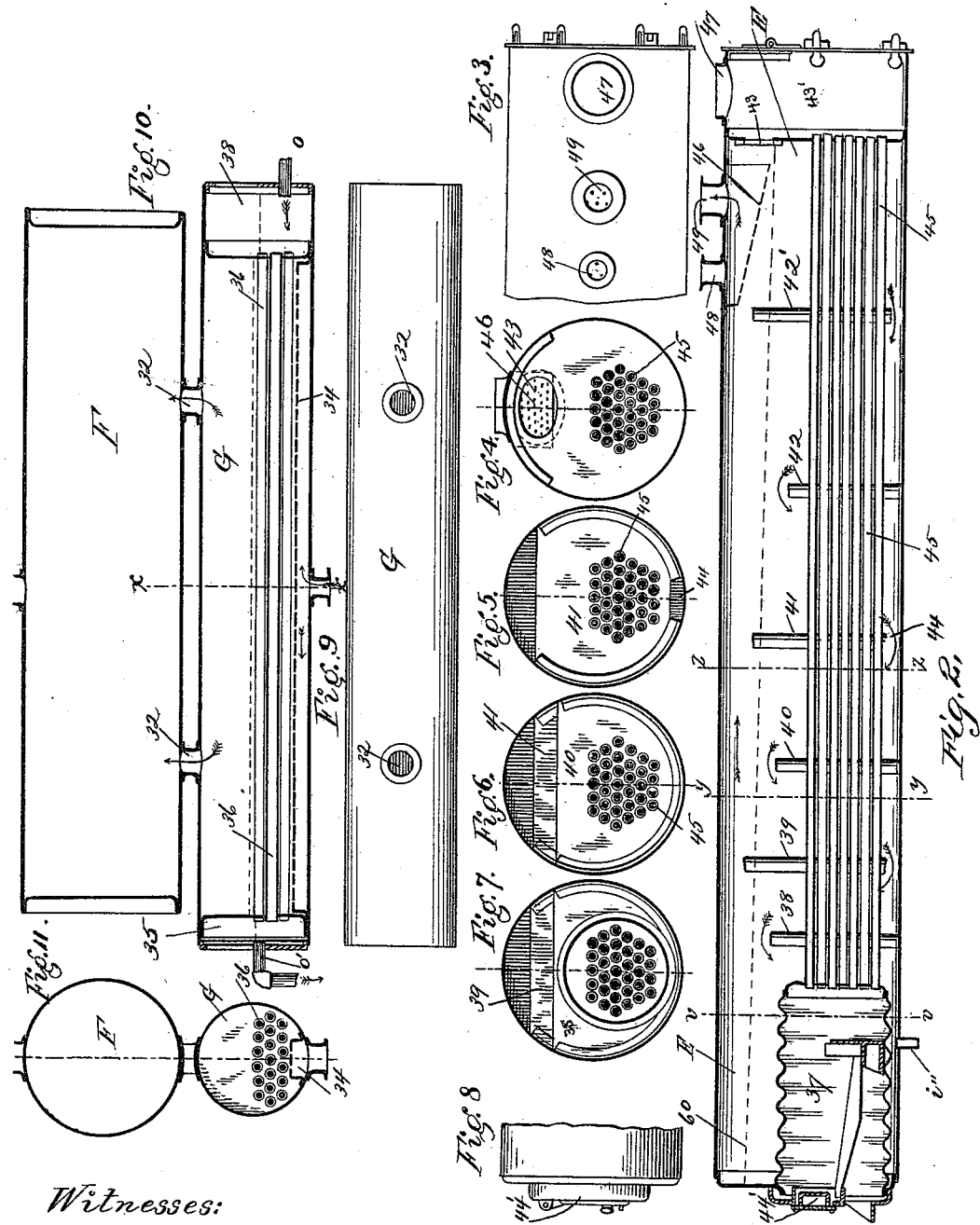

UNITED STATES PATENT OFFICE.

PATRICK J. McMAHON, OF TANGIPAHOA, LOUISIANA, ASSIGNOR TO THE STANDARD FIRELESS COMPANY, OF CHICAGO, ILLINOIS.

APPARATUS FOR MAKING ANHYDROUS AMMONIA.

SPECIFICATION forming part of Letters Patent No. 525,858, dated September 11, 1894.

Application filed October 7, 1891. Serial No. 407,983. (No model.)

*To all whom it may concern:*

Be it known that I, PATRICK JAY McMAHON, a citizen of the United States, residing at Tangipahoa, in the parish of Tangipahoa and State of Louisiana, have invented new and useful Improvements in Apparatus for Making Anhydrous Ammonia, of which the following is a specification.

My invention relates to the class of apparatus employed in separating pure anhydrous ammonia from the aqueous solution in which it is held, to produce an article of pure anhydrous ammonia more economically and rapidly than by any apparatus known in the present state of the art. Its object is to simplify the apparatus; dispense with the cumbersome appliances; reduce the expense, and, make a noticeable saving in time; and, also, without interrupting the continuous working and operation of the apparatus in producing anhydrous ammonia; to provide means for charging motors operated by ammoniacal gas, and to remove and receive the charge from such motors after the charge has been exhausted, to again separate the anhydrous ammonia from the aqueous solution and recharge the motor, repeatedly without loss or waste.

I have heretofore taken out patents for the process of producing pure anhydrous ammonia, for the apparatus therefor, and for recovering ammonia used in ammonia motors. These patents are as follows: Letters Patent No. 367,992, granted August 9, 1887; Letters Patent No. 367,993, granted August 9, 1887; Letters Patent No. 445,331, granted January 27, 1891, and I do not make any claim herein for any invention therein shown and described, the present invention being an improvement upon the apparatus shown and claimed in said patents; and the method of separating the pure anhydrous ammonia being different, more direct, and economical.

Similar letters and figures of reference are used to designate the same parts in the several figures of the drawings, in which—

Figure 1 represents a plan view of the general plant for producing anhydrous ammonia from an aqueous solution. It is to be observed that in this illustration several of the parts are shown as from a side view which in actual construction are vertical. The solution tanks B, C, and D in actual construction are located vertically above each other instead of on their sides as apparently shown. So also the condenser H and the various engines and pumps shown are to be constructed vertically in the usual manner, and so of some other parts. In the representation of the still E in this figure, the combustion chamber 43' and the opening for the smoke stack 47 are omitted as not requiring further illustration. Fig. 2 is a longitudinal sectional view of the still showing the furnace tubes, division plates, scattering plate, &c. Fig. 3, is a top view of a portion of the rear end of the solution boiler or still showing the position of the smoke pipe 47, the outlet for gas 49, inlet for the solution 48, &c. Fig. 4 is a view of the rear end of the solution boiler or still within the combustion chamber 43' showing the openings of the tubes 45, the manhole 43 through which can be seen the scattering plate 46. Fig. 5 is a sectional view of the solution boiler or still on the lines $z$—$z$ of Fig. 2 showing the partition plate 41 with the opening 44 beneath. Fig. 6 is a sectional view of the solution boiler or still on the line $y$—$y$ of Fig. 2, showing the partition plate 40 and the top of partition plate 41. Fig. 7, is a sectional view of the solution boiler or still on the line $v$—$v$ of Fig. 2, showing the front ends of the tubes 45, the end plate of the furnace into which they are introduced; and the partition plates 38 and 39. Fig. 8 is a top view of the front end of the solution boiler or still with the furnace door frame and door 44'. Fig. 9 is a top view of the lower tank G of the dehydrator F, showing the connecting openings 32 with the upper tank F. Fig. 10, is a vertical longitudinal sectional view of the dehydrator F, G, with connections 32 at each end, the water tubes 36 and the inlet and outlet pipes $o$ and $o'$ and the inlet into G for the gas pipe $e$. Fig. 11, is a transverse sectional view of the dehydrator F, G, the cold water tubes 36, and the inverted perforated trough 34.

Letter A represents an ordinary steam boiler with the common and usual steam pipe connections $a$, $a'$ and $a''$ with the steam pumps K, L; K', L'; and K'', L''.

B, C, D, represent solution tanks designed to receive and contain solutions of ammonia in different degrees of concentration. B to retain the concentrated or strong solution, practically incapable of absorbing any additional amount of ammonia; C containing a somewhat weaker solution, and D a still weaker or the weakest solution. These tanks B, C and D are connected as follows: At one end by the pipes $m$ and $t$ each respectively provided with the stop cocks 20 and 21. By these pipes when the concentrated solution in tank B is withdrawn as hereinafter explained, and the solution in tank C is proportionately strengthened by the absorption of ammonia, its contents are passed into tank B and the solution concentrated. The other ends of tanks B, C and D are connected by pipes 30 and 31 each respectively provided with check valves 13 and 14. The tank D is provided with a perforated tube 50 connecting with pipe 13, so that when any ammoniacal gas escapes from tank C it passes at once into the perforated pipe 50, and is distributed through the solution in tank D, being at once absorbed. Tank C is provided with a similar perforated tube $50'$ connecting with pipe 31 by means of which any gas escaping from tank B is similarly distributed in the solution held therein and at once absorbed. Tank B is provided with a similar perforated tube $50''$ which may receive the gas from the blow off tank I through the pipe $i'$, or from the pipes 26 and 25, the pump $L''$ and the pipe $b$. In the latter case the anhydrous ammonia remaining between the stop cock in the pipe on the motor which connects the pipe $h$, and the stop cock 3 in the pipe $h$ is pumped into the tank B.

The solution boiler or still E is supplied with the concentrated solution drawn from the tank B and forced into E through the pipes M, $M''$ by means of the steam pump K, L. Tank J is connected by the pipe 62 with the upper part of the tank D. In case tank D becomes too full of weak solution the latter can escape and flow through the pipe 62 into the tank J and be drawn off. Aqueous and ammoniacal vapors collecting in the upper part of tank D can also pass into the tank J and be condensed and absorbed. The blow off tank I is connected with the front end of the solution boiler or still E immediately beneath the fire chamber by the pipe $i''$ having the stop cock 12; and, also, with the concentrated solution tank B by the pipe $i'$ having the stop cock 10.

Connected with the tanks B and D are the pipes $d$ provided with the stop cocks 6 and 7; $b$ having the stop cock 9, and connecting with the steam pump $L''$, $K''$; R having the stop cock 4 and 8; pipe 26 with its stop cock 27 and pipe 25 connecting with the steam pump $L''$, $K''$. By means of these connections the force pump $L''$ $K''$ can be made to withdraw the concentrated solution from a motor through the pipe R into the tank B and recharge the motor with a weak solution from the tank D by a proper arrangement of the various stop cocks. The solution boiler or still E is supplied with the concentrated solution from the tank B by means of the steam pump K, L, operating the pipes M, $M''$, and forcing the solution into the still through the opening 48 upon the perforated scattering plate 46.

In my present invention the furnace and the grate are introduced into the front end of the boiler shell itself. Flues 45 extend from the front wall of the furnace chamber to the rear end in the combustion chamber. The solution boiler or still is located in an incline plane so that the furnace end is somewhat lower than the rear end; the water line 60 being higher at the front end than at the rear. The interior of the solution boiler or still is provided with the flues 45 being alternately higher and lower than the water line. The higher ones being provided with openings 44 at their lower edges so that the current of the solution from the rear end where it is admitted, through the opening 48, upon the scattering plate 46, will pass under the diaphragm or partition $42'$, over the partition 42, under the partition 41, over partition 40; under partition 39 and over partition 38; and ultimately out through the pipe $i''$ down through the blow off tank I and into the tank D through the pipe $i$.

I do not limit myself to any special number of diaphragms or partitions, but prefer the number shown.

37 represents the furnace chamber; $43'$, the combustion chamber; and 47, the exit or smoke stack. The dehydrator F, G, is constructed of two tanks, connected by the hollow tubes or saddles 32; the upper one F being a gas chamber. The tank G is provided with two water chambers 35 and 38 at its respective ends and these chambers are connected by cold water pipes 36 and are also provided with an induction pipe $o$ and an eduction pipe $o'$; so that a stream of cold water flows from the water table O through the pipe $o$ and through the cold water tubes 36 and out through the eduction or waste pipe $o'$.

At the bottom of the tank G is located the inverted perforated trough 34 and into this trough flows the gas which passes from the solution boiler or still E through the pipe $e$ into G; and as the solution in G is under pressure, and is subject to a constant flow of gas, it quickly becomes a concentrated solution and ceases to absorb the gas, and being kept at a comparatively low temperature by the constant flow of cold water through the pipes 36 immersed in it; all aqueous vapors are condensed and practically an absolutely pure ammoniacal gas passes into the chamber F. Preferably in beginning the operation of producing anhydrous ammonia, the tank G is filled in the ordinary manner through an opening therein or by pipes with sufficient of the concentrated solution of ammonia to cover the water pipes located in said tank, but this is not absolutely essential.

Number 51 represents a check valve in the pipe e.

A constant supply of concentrated solution is furnished by the steam pump K, L, to the solution boiler or still E and a constant pressure being exerted in the dehydrator F—G produced by the heat in the solution boiler or still, the ammoniacal gas is forced through the pipe f into the condensing coils N which are constantly sprayed with water and their temperature reduced by means of the steam pump K', L', which draws the water from its source through the pipe e' and forces it upon the scattering plate or table O through the pipe l whence it falls upon and through the condensing coils N and is caught upon the floor or table Q and carried off through the waste pipe. The ammoniacal gas being thus condensed into a purely anhydrous ammonia, passes through the pipe 61, into the tank H, and is there ready for use. When the anhydrous ammonia is to be withdrawn from the tank H the stop cocks 2 and 3 are opened and the ammonia passes down and out through the pipe h being forced by the pressure from the solution boiler or still.

An indefinite number of condensing coils may be connected with the manifold p with which the pipe f is connected, the other terminals of such coils being connected with the second manifold $p^4$ with which the pipes 61 is in like manner connected. From the top of the blow out tank I proceeds a pipe i' having a stop cock 10 and connecting with the solution tank B by means of which any ammoniacal gas developed in the tank I may be forced down into the tank B and be there absorbed.

Having thus described the construction of my invention, I proceed to describe its mode of operation. It is to be understood that the function of the apparatus is to divide two liquids having a strong affinity for each other, but whose boiling points vary greatly from each other, and in consequence the separation can readily be accomplished by heat. When in operation, the solution boiler or still E is filled with aqueous ammonia up to the dotted line 60 by pumping the same through the opening 48 upon the scattering plate 46. A supply of cool concentrated ammonia is kept in the lower tank G of the dehydrator. The tank B is also supplied with a concentrated solution of ammonia. The steam pump K, L, draws the concentrated solution from the tank B through the pipe M, and forces it through the pipe M' and opening 48 over the scattering plate 46 into the solution boiler or still. The solution at once meets with the heat of the still, and the separation of the aqueous ammonia gas from the solution at once begins. The continuous introduction of the concentrated solution causes a slow movement or current in the liquid toward the front end of the still. It passes over and under each alternate partition, gradually losing its ammonia which volatilizes into gas until it has reached the furnace end of the still. It has parted with practically all its ammonia, and has become a weak solution approximating to water. The gas generated passes out through the opening 49 into the pipe e and enters the lower tank G of the dehydrator by means of the inverted trough 34. The gas is distributed through the cool concentrated solution at the bottom of said tank, and is freed from any intermingled aqueous vapors by the condensation of the latter, and the pure ammoniacal gas passes from the tank G through the hollow tubes or saddles 32 into the gas chamber F and from thence, in consequence of the continuous pressure through the pipe f and manifold p into the condensing coils N where it is condensed into a liquid anhydrous ammonia, and flows off through the pipe 61 into the receiving tank H. The condensation is effected by keeping the condensing coils at a low temperature. This is done by spraying them with cold water by means of the steam pump K', L' which receives the water through the pipe e' and discharges it through the pipe l into the trough O which being perforated permits the water to be sprayed upon the coils N. The water is caught and collected in the drip tank or pan Q held on the supports q, q, q, whence it runs off through a waste pipe. Of course these condensing coils may be kept cool by any of the known means for reducing temperature.

While the process of separation of ammonia from the solution in the still and the condensation of the gas into anhydrous ammonia is proceeding the weak solution at the front of the solution boiler or still is at intervals blown out through the pipe i'' into the blow off tank I. When released from pressure a portion of the ammonia in the weak solution in tank I separates and assumes the gaseous form and passes through the pipe i' and being distributed through the perforations in pipe 50'' in tank B is absorbed by the solution therein. The remaining solution in tank I which retains but a small percentage of ammonia and is nearly pure water is transferred through the pipe i into the tank D. A partially concentrated solution is maintained in the weak solution is maintained in the tank C by opening the stop cock and permitting the weak solution in D to descend into it; and as the solution in C becomes more and more concentrated, it is transferred by opening the stop cock 21 in the pipe t into the solution tank B. When the solution in tank B becomes so concentrated that it will absorb no more gas, the accumulating gas is permitted to escape through the check valve 14 in pipe 31 into the tank C through the perforated pipe 50' where it is at once absorbed in the weaker solution in said tank. Should any of the escaping gas be not thus absorbed in tank C it will pass on through the check valve 13 in pipe 30 through the perforated pipe 50 into the still weaker solution in tank D where it will be absorbed. When the solution has been sufficiently fed into the solution boiler or still E, the ammonia separated from the solution and condensed into anhydrous ammonia and run into the tank H; and the solution or water from which the ammonia has been separated has passed into the tank D, the process of separation is complete, and the anhydrous ammonia is ready for any of the uses it is peculiarly adapted for, such as making ice, or as a motive power (in addition to many uses which consume it) where it may be used over and over again indefinitely without consuming or wasting it. For instance, in applying the anhydrous ammonia for motive power, the weak solution is charged into an outer tank on the motor and the anhydrous ammonia is charged into an interior tank which is immersed in the weaker solution. The ammonia then volatilizes and gives out the power generated by heat in separating it from the solution and the gas is again united with and reabsorbed by the solution.

The motor described is charged with the weak solution and the anhydrous ammonia and the charge is withdrawn from the motor so it can be again charged in the following manner: The pipe $h$ is connected with the inner tank or receiver of the motor and the valves 2 and 3 are opened. The ammonia will then flow by the pressure in the tank H into the ammonia tank or receiver of the motor until it is sufficiently charged. The pipe R is connected by coupling to a similar pipe on the outer tank of the motor. The cock 6 in the suction pipe $d$ connecting with the pump L″, K″ is opened; cock 7 in pipe $d$ is closed; the cock 9 in the discharge pipe $b$ is closed; and the cock 8 in the pipe R is open. The pump L″, K″ then pumps the weak solution from the tank D into the outer tank of the motor. When the ammonia has performed its function in the motor and been reabsorbed, the weak solution has become a strong or concentrated solution and must be withdrawn, so that the ammonia may be again separated and condensed and the motor recharged. It is evident that the plant may be sufficiently extensive and the solution tanks B, C, D, and the still E, tank H and the other parts, sufficiently extensive to charge any number of motors.

The discharge of the solution in the motor is effected as follows: The stop cock 6 in the pipe $d$ is closed and stop-cock 9 in discharge pipe $b$ is opened. The pump L″, K″ then pumps the strong solution from the outer tank of the motor into the concentrated solution tank B. In this manner the latter tank B is being supplied with a strong solution from which the solution boiler or still E is supplied and the process of separation goes on or is repeated. On the motor are located charging pipes provided with valves corresponding with and similar to the valves 3 and 4, and at all times when these pipes are coupled up, and the motor charges it is necessary to empty the spaces between the valves 3 and 4 and the corresponding valves in the motor before uncoupling them. In the case of the pipe R, the valve on the motor is first closed, when the space between the valves and also the pipe is emptied by the pump and the solution forced into the tank B. The connecting pipes are then uncoupled and the valve 4 closed. In the case of the pipe $h$ which contains the ammonia the valve 3 and the corresponding valve on the motor are kept closed until the steam pump L″, K″ has emptied the space between the two valves and withdrawn the contents thereof through the pipe 26 and valve 27, and forced them through the pipe $b$ into the tank B when the valve 27 is closed and the uncoupling is made. When the liquid accumulates in the dehydrator G in consequence of the condensation of watery vapors therein, the surplus is blown off through the pipe M′ and cock 11 into the steam pump L, K or through the pipe M into the solution tank B to be again fed into the still E. It is evident there may be many changes and variations in the specific construction and arrangement of parts in my invention without departing from the spirit thereof, and I do not limit myself to the precise construction or arrangement shown.

Having thus described my invention, what I claim as new, and desire to secure by Letters Patent of the United States, is—

1. In an apparatus for producing anhydrous ammonia, the combination with a series of solution tanks located above each other and connected at one end by pipes having stop cocks and at the other end by pipes having check valves, of a vertical blow off tank connected with the uppermost tank and with the lowermost tank, a solution boiler or still connected with the lowermost tank and with the blow off tank, a dehydrator connected with the said still, a receiving tank, a condensing device interposed between the dehydrator and the receiving tank, pumps, and mechanism for operating the same, said pumps being operatively connected with the several parts, substantially as described.

2. In an apparatus for producing pure anhydrous ammonia, a series of solution tanks connected at one end by pipes having stop cocks and at the other end by pipes having check valves; and each provided within the lower part of its chamber with a perforated pipe into which respectively enter the inlet pipes to said tanks; and said solution tanks being also provided with openings for pipe connections with other portions of said apparatus; all substantially as shown.

3. In an apparatus for producing pure anhydrous ammonia, a solution boiler or still, provided with a fire chamber within said boiler or still at one end thereof; and an exit or smoke stack; and having fire flues running practically the whole length of said boiler or still; and a series of partitions or division plates within said boiler or still pierced by said flues; said plates being alternately higher and lower than each other the higher plates having openings at their lower edges and said boiler or still having an inlet for the reception of solutions at or near one end and an outlet near the same end for the escape of gas, and an outlet at or near the opposite end for the discharge of the weak solution; all substantially as shown.

4. In an apparatus for producing pure anhydrous ammonia a dehydrator constructed of two tanks or chambers connected together by tubular connections or saddles; the upper tank having an opening for connection with the condenser in said apparatus; the lower chamber provided with a water chamber at each end connected by water tubes or flues; also with an opening in its under side for the admission of ammoniacal gas and with an induction and outlet water pipe at each end respectively connecting with said water chambers; all substantially as shown.

5. In an apparatus for producing pure anhydrous ammonia a dehydrator constructed of two tanks or chambers connected by tubular connections or saddles; the upper tank having an opening for connection with the condenser in said apparatus; the lower chamber provided at the bottom thereof with an inverted perforated trough and with a water chamber at each end connected by water tubes or flues; also with an opening in its under side for the admission of ammoniacal gas and with an induction and outlet water pipe at each end respectively connecting with said water chambers; all substantially as shown.

6. The combination of the solution tanks, the solution boiler, dehydrator, condenser and ammonia receiver with their various connections, pipes, pumps and means for operating them, with the pipes R and $h$ having independent connections for a motor and their respective stop cocks, said pipes being connected respectively with the strong solution tanks and with the receiver, and connections between said pipes, a pump having connections with each of said pipes and means for controlling them at will, whereby anhydrous ammonia and weak solution may be discharged into receiving vessels simultaneously or separately and solutions of ammonia to be treated may be introduced into said solution tanks, all substantially as described.

PATRICK J. McMAHON.

Witnesses:
 WM. S. CAMERON,
 WM. J. STAPLETON.